Nov. 3, 1936. J. GRISON Re. 20,158

FIRE ALARM DEVICE

Original Filed Jan. 2, 1934 2 Sheets-Sheet 1

INVENTOR
JOSEPH GRISON
BY
C. James Cottrell
ATTORNEY

Nov. 3, 1936. J. GRISON Re. 20,158

FIRE ALARM DEVICE

Original Filed Jan. 2, 1934 2 Sheets-Sheet 2

INVENTOR
JOSEPH GRISON
BY
C. James Cottrell
ATTORNEY

Reissued Nov. 3, 1936 Re. 20,158

UNITED STATES PATENT OFFICE 20,158

FIRE ALARM DEVICE

Joseph Grison, New York, N. Y., assignor to National Fire Detector Corporation, a corporation of Delaware Original No. 1,987,590, dated January 8, 1935, Serial No. 704,885, January 2, 1934. Application for reissue March 4, 1936, Serial No. 67,187

8 Claims. (Cl. 116—106)

This invention relates to fire detector and alarm devices, and more particularly to improvements in self-contained devices which produce an audible signal when certain parts thereof attain a predetermined temperature.

Heretofore, there have been produced fire detector and alarm devices provided with thermostatic or similar temperature responsive means to close an electric circuit when a predetermined temperature is reached, the closing of the electric circuit causing the energization of a solenoid to ring a bell or the like. Such devices, however, have been found objectionable in that they are essentially dependent upon a source of electrical energy; and in many instances the very fire which the device is intended to detect may destroy the electrical wiring and disconnect the source of electrical energy so that the fire alarm device becomes ineffective to produce an alarming signal as desired. In other words, such devices are not reliable; and reliability is very important in fire alarm devices.

It is, therefore, an object of this invention to provide a self-contained fire detector and alarm device, which does not rely in any way upon an external source of energy, said device being provided with heat movable or temperature responsive means to cause the device to produce an alarming signal when a predetermined temperature is attained.

A further object is the provision of a fire detector and alarm device of simple structure, having the parts thereof constructed and arranged so that there is no likelihood of the device getting out of order, and enabling the device to be readily and conveniently manufactured and marketed at a low cost.

These and other objects are attained by the novel construction, combination and arrangement of parts hereinafter described and shown in the accompanying drawings, constituting a material part of this disclosure, and in which.

Figure 1:
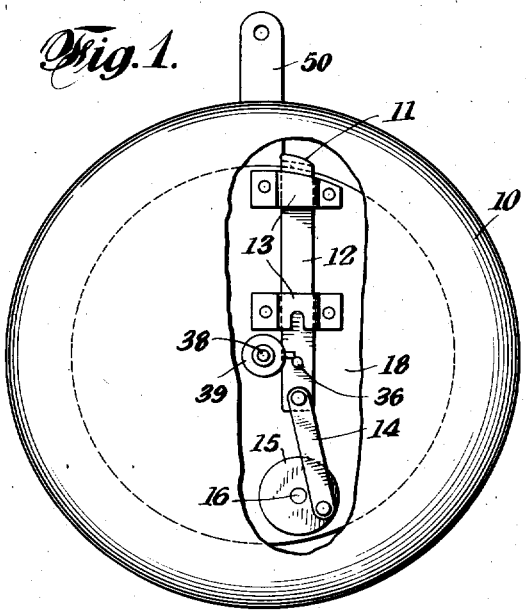
Fig. 1 is an elevational view of the device, with a part broken away to show internal details thereof.
Figure 2:
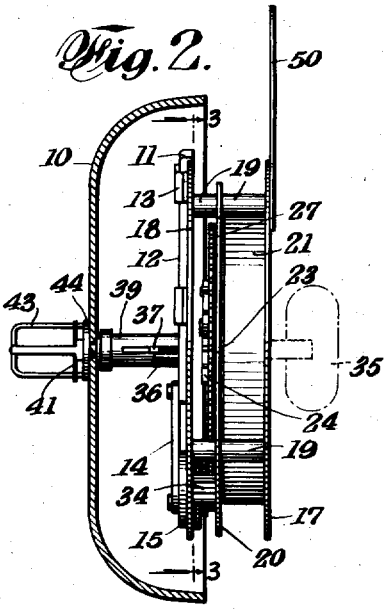
Fig. 2 is a sectional view of the device.

Referring to Fig. 1, the fire detector and alarm device is shown to include a bell 10 of the gong type, which produces an audible signal by impact with the curved tip 11 of a plunger or clapper 12, slidable in guides 13 and pivotally connected to a pitman 14, the latter being pivotally and eccentrically connected to a crank wheel 15, which is fixed to and rotates with a shaft 16 supported by a plate 20, which is between the plates 17 and 18, and connected to plates 17 and 18 by posts 19.

Figure 3:
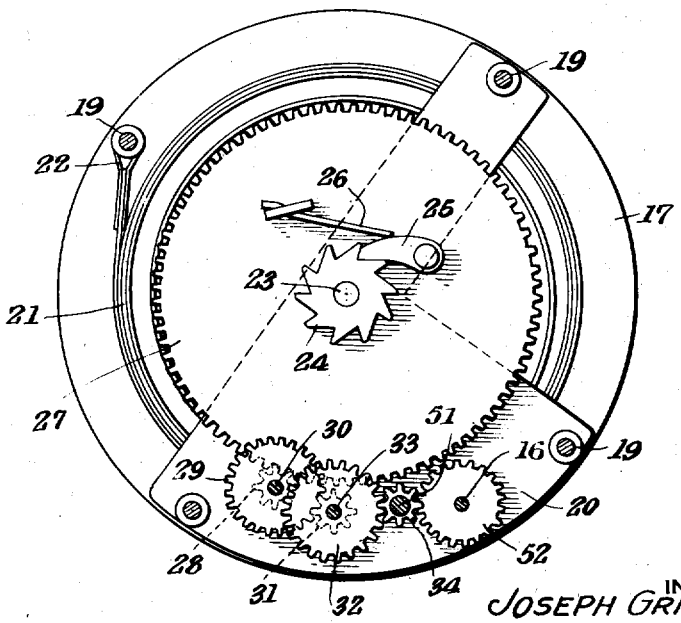
Fig. 3 is a sectional view taken on line 3—3 of Fig. 2.
Figure 4:
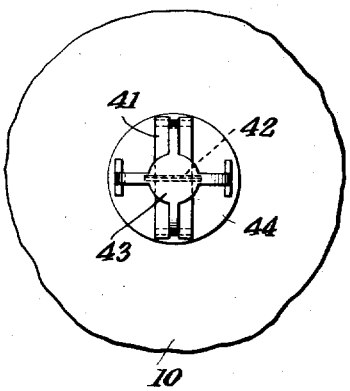
Fig. 4 is a plan view of a temperature responsive device used in the fire alarm device.
Figure 5:
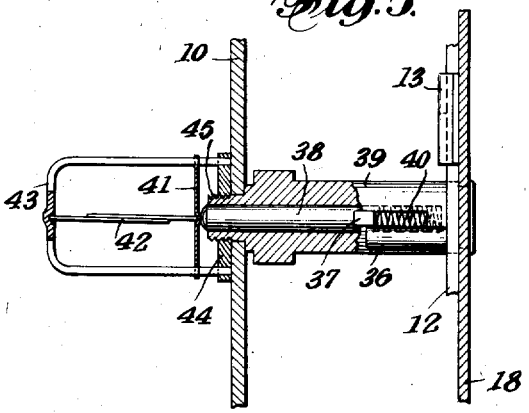
Fig. 5 is a sectional view showing the arrangement of the temperature responsive device in connection with detent means used in the fire alarm device.

Positioned between plates 17 and 20 is a coiled flat spring 21, of the clock type, having one end 22 attached to a post 19, the other end of the spring being attached to the shaft 23, to which is fixed a ratchet wheel 24 engaging a pawl 25 carried by a large gear 27 which pawl is urged into position to engage the ratchet wheel by means of a spring 26 (see Fig. 3).

Loosely mounted on the shaft 23 is the large gear 27, meshing with a pinion 28 fixed to a shaft 30. On the shaft 30 is also fixed a gear 29, engaging a pinion 31 on a shaft 33, which has fixed thereto a gear 32, engaging pinion 34 which is fixed to shaft 51 and the pinion 34 engages the gear 52, fixed to shaft 16, to which the crank wheel 15 is attached. The spring may be wound by a key 35 of the conventional type in the well known manner.

When the spring 21 is being wound, the ratchet 24 and shaft 23 are rotated counter-clockwise as viewed in Fig. 3, the large gear 27 remaining stationary and the pawl 25 overriding the teeth of the ratch 24. The spring is prevented from unwinding by means of the pin 26. When, however, the pin 36 is released the shaft 23 and the ratchet 24 are rotated clockwise as viewed in Fig. 3. The teeth of the ratchet 24 engage the pawl 25 which is secured to the gear 27 so that the gear 27 is likewise rotated clockwise as viewed in Fig. 3; the gear 29 is rotated counter-clockwise; the gear 32, clockwise; the gear 34, anti-clockwise; and the gear 52 and shaft 16, clockwise. Inasmuch as the crank wheel 15 is secured to the shaft 16 the crank wheel 15 is rotated, which imparts a reciprocating movement to the plunger 12. It is of no great importance as to which shaft carries the crank wheel 15, it being well understood in the art that the more reduction gearing which is employed, the longer the bell would ring, but too much gearing should not be employed so as to place such a strain on the spring 21 that it could not operate the plunger.

Projecting from the plunger 12 is a pin 36 which is adapted to engage an arm 37 projecting at right angles from a rod 38 slidable in the tubular member 39, and normally urged out of the path of pin 36 by a compression spring 40. The rod 38 is held down, against the action of spring 40, by a strip of metal 42 which is fusible at a predetermined temperature. The strip of fusible metal 42 is positioned in a frame 43 and bears against a brace 41, which directly engages the rod 38. The frame 43 is attached to a plate 44, which engages the threaded portion 45 of the member 39.

In operation, when a predetermined temperature is caused by a fire or otherwise, the metal strip 42 fuses and allows the rod 38 to release the plunger 12. Unwinding of spring 21 will cause rotation of the crank wheel 15 to reciprocate rapidly the plunger 12, so that the curved end 11 thereof will strike the gong 10 and produce an alarming sound, which will continue for an appreciable length of time. The device may be placed in condition to again give an alarm when a predetermined temperature is reached by providing the device with a new fusible strip 42.

Figure 6:
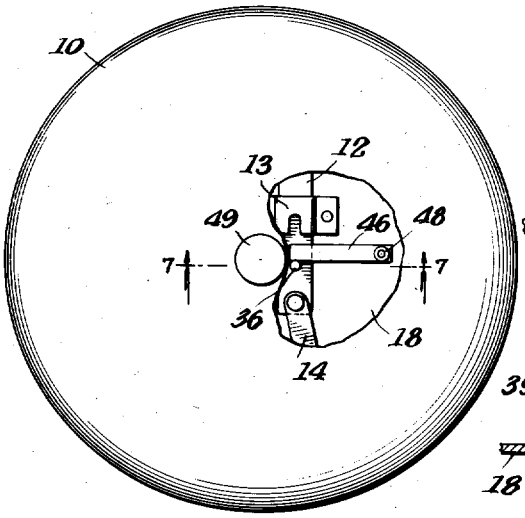
Fig. 6 is an elevational view of a fire alarm device having a modified form of temperature responsive means.
Figure 7:
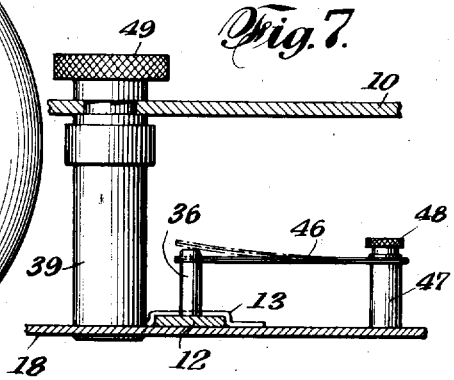
Fig. 7 is a sectional view taken on the line 7—7 of Fig. 6, looking in the direction of the arrows and showing the heat movable or temperature responsive and detent means used in the modified form.

In Figs. 6 and 7 are shown details of a modified form of detent for preventing movement of the plunger 12. In this form, the pin 36 is normally engaged by a flat strip 46 of thermostatic metal lying in a plane parallel to the plane in which the plunger moves. By thermostatic strip, I, of course, mean a strip composed of two sheets of metal having different expansion coefficients, the said two sheets lying parallel and being united together. A change of temperature, therefore, causes one of the sheets to expand more than the other, which causes the free end of the sheets to move transversely of the plane of the sheets, that is, causes the thermostatic strip to move when heated from the position shown in full lines in Fig. 7 to the position shown in dotted lines in the said figure. The strip 46 extends at right angles to the path of movement of the pin 36 and is attached to a post 47 by means of a knurled nut 48. The bell or gong 10 is secured to the tubular member 39 by means of a similar knurled nut 49.

In certain of the claims I refer to a heat movable device and by this expression I mean any device which is moved by a change in temperature, such as the strip of bi-metal material 46 shown in the drawings. The expression "heat movable device" is used in contra-distinction to a device which has a fusible element therein which when melted would release certain mechanism which might perform certain functions.

In operation, when the thermostatic strip 46 is heated to a predetermined temperature, it will curl outwardly as shown in dotted lines in Fig. 7, to release the pin 36 to allow free reciprocation of the plunger 12, as above explained. Among the advantages of having a heat movable device might be mentioned the following:

1. It eliminates a fusible element which would have to be replaced entailing (a) The expense of the new fusible element.

(b) When a fusible element is used the instrument is rendered useless after it has been used until the new fusible element is obtained and installed, whereas with the thermostatic strip it is always ready for use.

(c) The trouble to install the new fusible element, which might require the services of an expert.

(d) The danger and possibility of the fusible element being damaged and made inoperative for purpose intended because it projects out beyond body of mechanism and is exposed to tampering or accidental derangement or destruction.

2. The heat movable device is cheaper in the first instance.

3. The heat movable device is far simpler in structure.

4. The heat movable device is easier to manufacture.

5. The heat movable device would not deteriorate as quickly as a fusible element.

6. The heat movable device eliminates any needless parts.

7. The heat movable device is simple and reliable.

8. The heat movable device is protected by the body of the mechanism and is not exposed to tampering or accidental derangement or destruction.

Attached to wall 17 is a tab 50 having an aperture to enable the device to be conveniently hung on a wall.

From the above description, it will be seen that I have provided a simple and effective self-contained fire detector and alarm device which will automatically produce an audible signal when a predetermined temperature has been attained; and which is not dependent upon outside sources of energy, such as an electric current, for its operation.

The foregoing disclosure is to be regarded as descriptive and illustrative only, and not as restrictive or limitative of the invention, of which obviously an embodiment may be constructed including modifications without departing from the general scope herein indicated and denoted in the appended claims.

Having thus described my invention, what I claim as new and desire to secure by Letters Patent, is:

1. In a fire alarm device, a bell, a plunger, means to guide the plunger in a straight line, spring means to reciprocate the plunger into and out of contact with the bell, and fusible means to prevent movement of the plunger until a predetermined temperature has been reached.

2. In a fire alarm device, a bell, a plunger, a revolution crank connected to the plunger, spring means to cause the crank to be rotated through a number of revolutions to cause the plunger to reciprocate longitudinally of its length into and out of contact with the bell, a pin projecting from the plunger, and a strip of heat movable metal mounted adjacent the plunger and engaging the pin to prevent movement of the plunger until a predetermined temperature has been reached.

3. In a fire alarm device, a bell, a plunger, means to reciprocate the plunger longitudinally of its length into and out of contact with the bell, a pin on the plunger, and a strip of heat movable metal mounted adjacent the plunger and engaging the pin to prevent movement of the plunger until a predetermined temperature has been reached.

4. In a fire alarm device, a bell, a ringing means movable longitudinally of its length for said bell, a guide for said ringing means, a heat movable device, and means carried by the ringing means and normally engaging the heat movable device.

5. In a fire alarm device, a bell, a ringing means for said bell, a heat movable device consisting of a flat bi-metallic strip, a holding means carried by the ringing means, said strip having an edge thereof normally engaging said holding means and holding inoperative said ringing means, said heat movable device being so constructed as to curl laterally of its length to release said holding means when a predetermined temperature has been reached.

6. In a fire alarm device, a bell, a clapper therefor, means to move said clapper back and forth repeatedly longitudinally of its length, a heat movable device normally preventing the operation of said clapper but being so constructed as to curl outwardly to curl laterally of its length to release the clapper when a predetermined temperature has been reached, and means to operate said clapper when it is released.

7. In a fire alarm device, a bell, a clapper therefor, a heat movable device, a stop carried by said clapper and normally engaging said heat movable device, said heat movable device being movable laterally out of engagement with said stop so as to release the clapper when a predetermined temperature has been reached, and means to operate repeatedly said clapper longitudinally of its length when it is released.

8. In a fire alarm device, a revolution member, means whereby said member is rotated, a bell, a striker operatively connected near one of its ends to said member and having its striking end at the other end thereof so that said striker is reciprocated longitudinally of its length, and a heat movable means controlling said striker, said heat movable means being so designed as when heated to a predetermined degree will cause the release of said striker.

JOSEPH GRISON.